April 19, 1960 S. WELTYK 2,933,357
VEHICLE BRAKE
Filed July 12, 1957
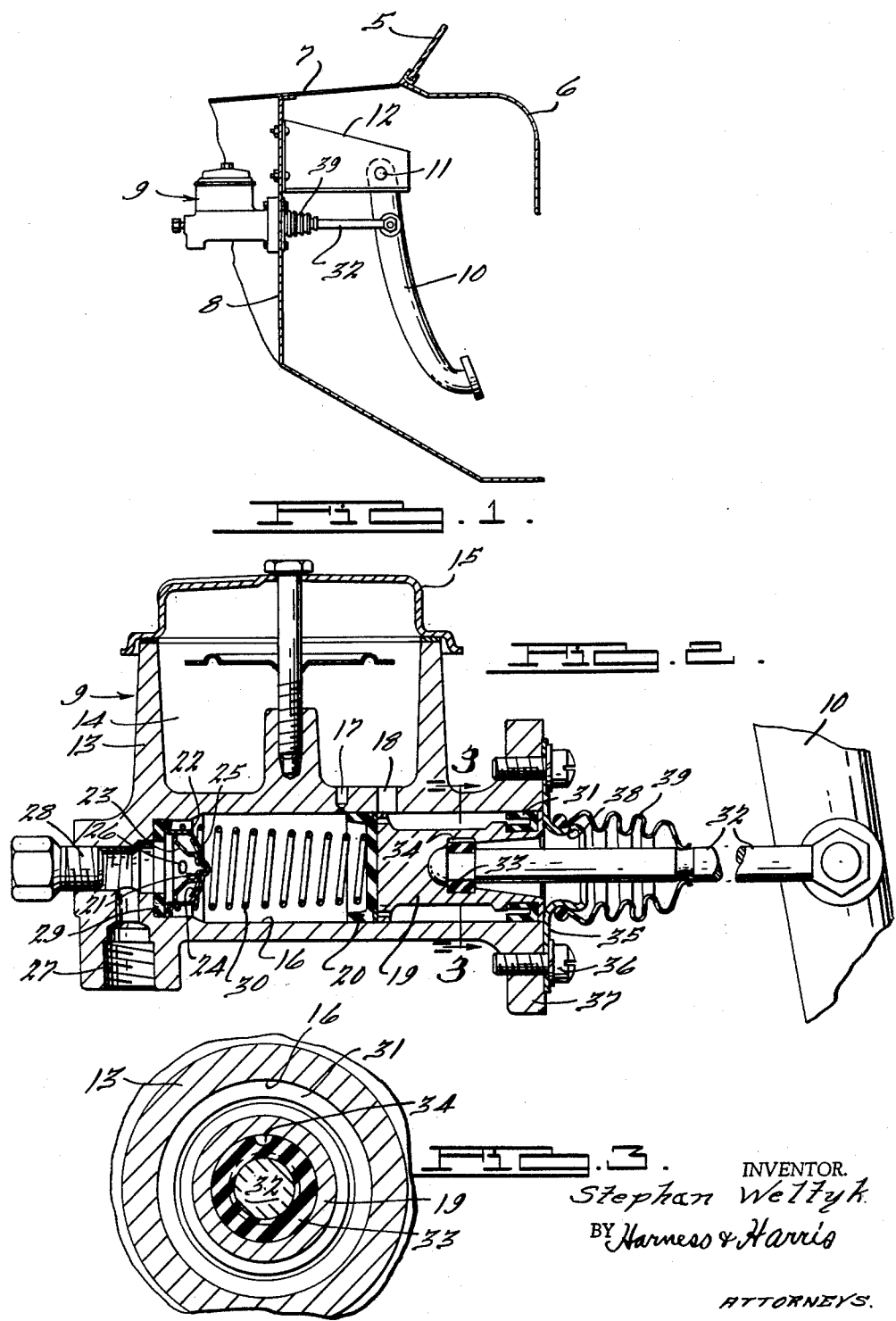
INVENTOR.
Stephan Weltyk
BY Harness & Harris
ATTORNEYS.

# United States Patent Office 2,933,357
Patented Apr. 19, 1960

2,933,357

VEHICLE BRAKE

Stephan Weltyk, Detroit, Mich., assignor to Chrysler Corporation, Highland Park, Mich., a corporation of Delaware Application July 12, 1957, Serial No. 671,447

4 Claims. (Cl. 309—20)

This invention relates to improvements in brakes and their operation and more particularly to hydraulic brakes for motor vehicles.

A braking system for a motor vehicle includes a cylinder and piston for each wheel brake to which fluid under pressure is supplied from a master cylinder by a piston having a power stroke and a retractile stroke, the piston being actuated by a push rod which is in turn actuated by a foot operated lever.

An object of the invention is to provide an arrangement wherein the piston and push rod are mechanically interconnected and wherein air is not drawn into the brake system on the retractile stroke of the piston and its push rod.

Another object of the invention is to provide a connection between the piston and push rod which eliminates the necessity for the conventional lever return spring and stop; and to provide a stop limiting movement of the master cylinder piston in its retractile stroke and which acts indirectly through the piston push rod connection to limit push rod and lever retractile movement.

A further object of the invention is to provide a connection between the piston and its push rod including a body of yieldable, preferably rubber-like, material which will accommodate canting movement of the push rod relative to the piston during the power stroke of the rod and piston and which can be forcibly deformed to release the push rod piston connection.

Other objects and advantages of the invention will be more apparent from the following description taken in connection with the accompanying drawings, in which:

Fig. 1 is a fragmentary side elevational view, partly in section, of a motor vehicle embodying the invention;

Fig. 2 is an enlarged elevational view, mainly in section, showing the master cylinder of Fig. 1 and its associated operating components; and Fig. 3 is an enlarged section taken on the line 3—3 of Fig. 2.

Referring to the drawings and particularly Fig. 1, the invention is shown applied to a motor vehicle, the pertinent structure of which includes a windshield 5, dash 6, cowl 7 and a wall 8 between the engine and passenger compartments. A master cylinder, generally designated by the numeral 9, is mounted on the wall 8 and a foot operated lever 10 is pivotally supported at 11 on a bracket 12 fixed to the wall 8.

A casting 13 provides a reservoir 14, closed by a removable cover 15, a cylinder 16, and ports 17 and 18 for fluid flow between the reservoir and cylinder. A piston 19 is slidable in the cylinder 16 and has a cup seal 20 of rubber-like material at the front face thereof, it being understood that the piston 19 moves to the left, as viewed in Fig. 2, on its power stroke and returns to its illustrated position on the retractile stroke. Fluid under pressure is discharged from the cylinder 16 under control of a valve 21 which includes relatively rigid cup members 22 and 23, between which is secured a rubber disc 24. The cup member 22 has a plurality of openings 25 covered by the disc 24 when the mechanism is positioned as shown, the disc deflecting under the force of fluid pressure to uncover the openings 25 to permit fluid to enter the space between members 22, 23. Fluid under pressure exits from this space through openings 26 in the member 23 and is discharged through the opening 27 to the brakes for one pair of oppositely disposed road wheels and through the opening 28 to the brakes of the other pair of oppositely disposed road wheels. The valve 21 is urged against its seat 29 by a coil spring 30 which abuts the cup member 23 and piston cup seal 20. A double lip-type seal 31 is disposed between the cylinder wall and piston at the end of the latter opposite the cup seal 20. The mechanism thus far shown and described together with its operation is generally well known.

The piston 19 is operated on its power stroke by a push rod 32 connected with the pedal lever 10. The piston has an axial recess, the base of which has a surface defining a portion of a sphere and the end of the rod 32 has a like surface. The piston has an annular groove in the surface of the wall bounding its axial recess and the rod 32 has an annular groove in its external surface. These registering grooves receive a ring 33 of rubber or rubber-like material which connects the push rod 32 and piston 19 for linear movement.

In assembly the ring 33 is placed in the groove of the push rod and the rod and ring moved into the piston recess until the ring 33 snaps into the piston groove. The ring 33 has an axially extending groove 34 in its outer periphery which permits the escape of air or other fluid past the ring and outwardly of the recess during assembly of the rod, ring and piston.

An abutment forming member 35 is bolted at 36 to a flange 37 of casting 13 and acts as a stop to limit the retractile stroke of the piston 19 under influence of the spring 30 and the pressure of fluid tending to return from the wheel brakes to the master cylinder. Inasmuch as the lever 10 and push rod 32 are connected to the piston, the rod and piston will be returned to the static position, as shown in Fig. 2, during the retractile stroke of the piston and the abutment 35 thus serves as a stop for the lever 10. This eliminates the necessity for the conventional lever return spring and stop. Furthermore, the lever 10 and rod 32 will move with the piston at a rate developed by forces acting on the piston to effect its retractile stroke and there is no tendency to draw air into the brake system on the retractile stroke of the piston. The use of a single stop eliminates the necessity in prior arrangements for adjusting the length of the push rod to insure engagement of the lever with its stop.

The abutment 35 has an annular flange 38 and a boot 39 of flexible material which embraces this flange and the rod 32 to form a seal for the recessed end of the piston 19.

For application of the brakes the lever 10 is swung clockwise, as viewed in Fig. 1, about its pivot 11 moving the push rod 32 to thrust the piston 19 on its power stroke and discharging fluid from the cylinder through the valve 21, as aforesaid, to the openings 27, 28 to the wheel brakes, the spring 30 being loaded on this stroke of the piston. Inasmuch as the point of attachment of the push rod to the lever will move in an arcuate path during swinging of the lever, the push rod 32 will undergo a canting or tilting movement, which is accommodated by the flare of the piston recess and the abutting spherical like surfaces of the piston and push rod. The rubber ring 33 will be deformed by such canting movement of rod 32, but the deformation of the material of ring 33 is maintained at a minimum due to location of the ring immediately adjacent the thrust end of the rod. When the lever is relieved of its actuating force the loaded spring 30 will return the piston to its stopped position, as illustrated, and the lever 10 will be likewise returned due to the piston push rod connection provided by the ring 33.

I claim:

1. A structure comprising a piston having a recess at one end thereof, a push rod in engagement with the base of the recess in said piston, said piston and rod each having a groove registering with the groove of the other, the groove in said rod being defined by spaced shoulders connected by a center portion and a body of rubber-like material in said grooves connecting said piston and rod for unitary movement.

2. A structure comprising a piston having a recess at one end thereof and a rounded surface at the base of said recess, a push rod having a rounded end in engagement with said surface in said recess, said piston and rod each having a groove registering with the groove of the other, and a ring of yieldable rubber-like material in said grooves connecting said piston and rod, said ring having cylindrical inner and outer surfaces.

3. A structure comprising a piston having a recess at one end thereof and a rounded surface at the base of said recess, a push rod having a rounded end in engagement with said surface in said recess, said piston and rod each having a groove registering with the groove of the other, and a body of rubber-like material in said grooves connecting said piston and rod for unitary movement, said body of rubber-like material having a groove in its outer periphery defining a passageway for the escape of air trapped between said surfaces incident to assembly of the piston and rod.

4. A structure comprising a piston having a recess at one end thereof, said recess including a base and tapering wall portions terminating in an annular groove adjacent said base, a push rod having a rounded end in engagement with the base of said recess and having an annular groove in registration with said first mentioned groove, and a ring of yieldable rubber-like material disposed in said grooves connecting said piston and rod for unitary movement.

References Cited in the file of this patent

UNITED STATES PATENTS

| | | |
|---|---|---|
| 769,248 | Brainard | Sept. 6, 1904 |
| 1,543,498 | Hammond | June 23, 1925 |
| 1,717,520 | Reilly | June 18, 1929 |
| 2,124,762 | Carroll | July 26, 1938 |
| 2,155,207 | Stocker | Apr. 18, 1939 |
| 2,242,096 | Thomas | May 13, 1941 |
| 2,436,908 | Weenen et al. | Mar. 2, 1948 |
| 2,452,247 | Larsh | Oct. 26, 1948 |
| 2,793,501 | Rike | May 28, 1957 |